United States Patent
Cousinard

(10) Patent No.: US 7,672,655 B1
(45) Date of Patent: Mar. 2, 2010

(54) FREQUENCY-SELECTIVE AND ADAPTIVE I/Q MISMATCH DIGITAL COMPENSATION

(75) Inventor: David Cousinard, Morges (CH)

(73) Assignee: Marvell International, Ltd., Hamilton (BM)

( * ) Notice: Subject to any disclaimer, the term of this patent is extended or adjusted under 35 U.S.C. 154(b) by 498 days.

(21) Appl. No.: 11/731,655

(22) Filed: Mar. 30, 2007

Related U.S. Application Data

(60) Provisional application No. 60/790,476, filed on Apr. 7, 2006.

(51) Int. Cl.
*H04B 1/10* (2006.01)

(52) U.S. Cl. ...................... 455/285; 370/206
(58) Field of Classification Search .................. 455/285
See application file for complete search history.

(56) References Cited

U.S. PATENT DOCUMENTS

2003/0174641 A1* 9/2003 Rahman ..................... 370/206

OTHER PUBLICATIONS

IEEE Journal of Solid-State Circuits, Vo. 41, No. 2, Feb. 2006—"I/Q Mismatch Compensation Using Adaptive Decorrelation in a Low-IF Receiver in 90-nm CMOS Process" —Imtinan Elahi, Khurram Muhammad, and Poras T. Balsara, Senior Member, IEEE. pp. 395-405.
IEEE Journal of Solid-State Circuits, Vo. 40, No. 12, Dec. 2005 —"A CMOS TV Tuner/Demodulator IC With Digital Image Rejection"—Chun-Huat Heng, Member, IEEE, Manoj Gupta, Member, IEEE, Sang-Hoon Lee, Member, IEEE, David Kang, Member, IEEE, and Bang-Sup Song, Fellow Member, IEEE. pp. 2525-2535.

* cited by examiner

*Primary Examiner*—Yuwen Pan
*Assistant Examiner*—Ajibola Akinyemi

(57) ABSTRACT

A phase mismatch compensation system includes a first summer that has a first input that communicates with a first phase of a received signal and an output. A second summer has a first input that communicates with a second phase of the received signal and an output, wherein the second phase is offset from the first phase. A first filter selectively filters the output of the first summer. An adaptive control module determines a predicted shift between the first and second phases of the received signal based on an output of the first filter and an actual shift between the first and second phases of the received signal. A correction module communicates with an output of the adaptive control module and the first phase and second phase of the received signal. The correction module outputs a mismatch correction to second inputs of the first and second summers respectively.

38 Claims, 10 Drawing Sheets

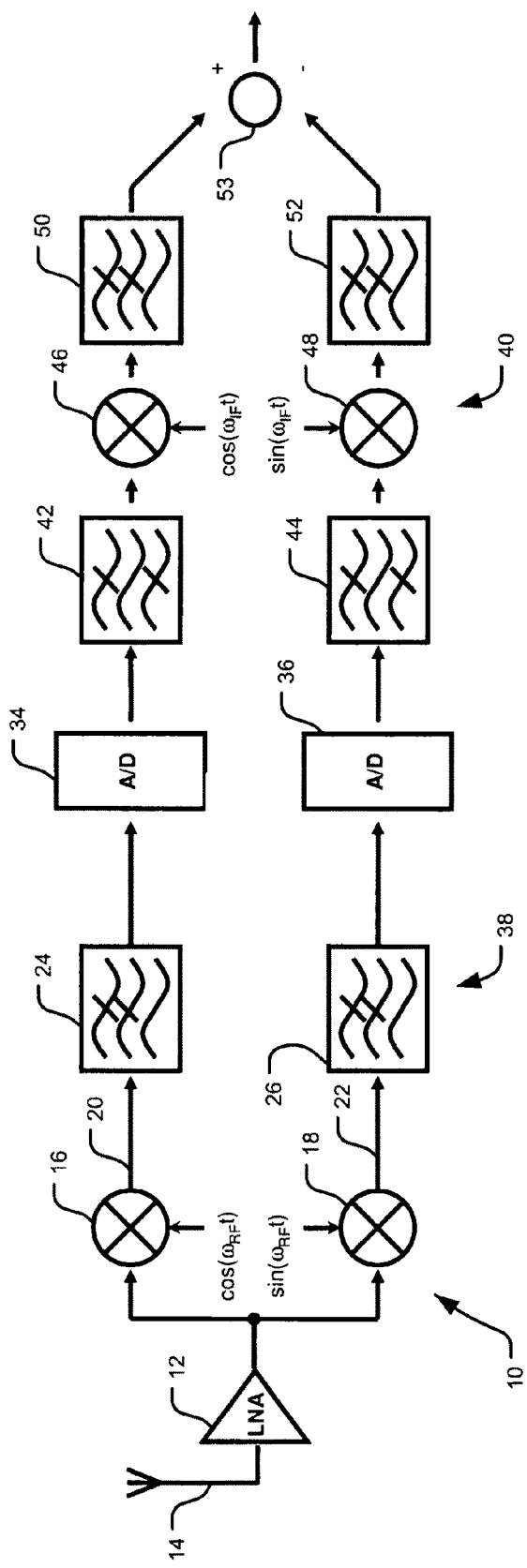
FIG. 1
Prior Art
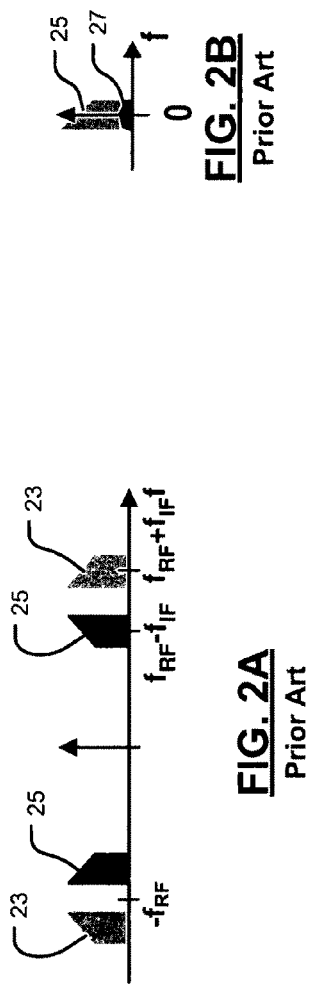
FIG. 2A
Prior Art
FIG. 2B
Prior Art

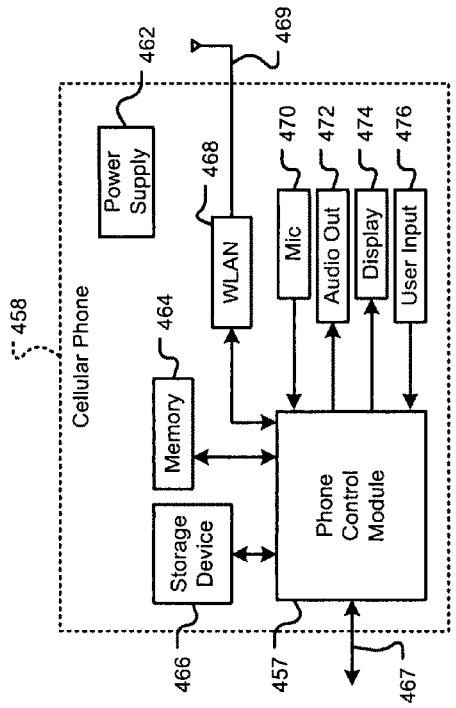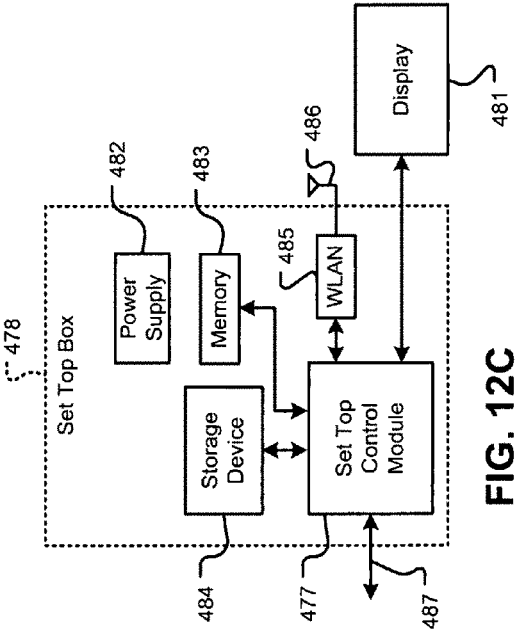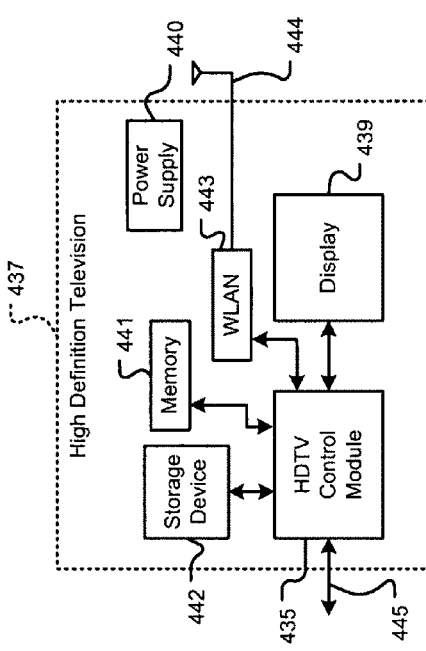

FREQUENCY-SELECTIVE AND ADAPTIVE I/Q MISMATCH DIGITAL COMPENSATION

CROSS-REFERENCE TO RELATED APPLICATIONS

This application claims the benefit of U.S. Provisional Application No. 60/790,476, filed on Apr. 7, 2006. The disclosure of the above application is incorporated herein by reference in its entirety.

FIELD

The present disclosure relates generally to signal processing, and more particularly to signal processing including compensation for image rejection.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Referring now to FIGS. 1, 2A, and 2B, a heterodyne receiver 10 receives radio frequency (RF) signals in a low noise amplifier (LNA) 12 via an antenna 14. An in-phase (I) channel mixer 16 and a quadrature (Q) channel mixer 18 downconvert the incoming RF signals to an intermediate frequency (IF). The I/Q channels 20, 22 may be routed to respective filters 24, 26. The I/O channels may include an image signal 23 and a desired signal 25, as shown in FIG. 2A. Generally, components within the I/O channels contribute to gain and phase mismatch resulting in image residue 27 or leakage in a desired signal 25. In other words, the desired signal 25 is corrupted with an image signal 23, as illustrated in FIG. 2B.

RF mixers 16, 18, low-pass filters 24, 26, and analog-to-digital converters 34, 36 may produce gain and phase mismatches between the I and Q channels. Analog-to-digital converters 34, 36 convert the analog signals 20, 22 to the digital domain. IF mixers 46, 48 receive I and Q signals through filters 42, 44. A common technique for gain and phase mismatch correction is to do the correction inside the IF mixers 46, 48. Coefficients for gain and phase mismatch may be obtained in a one-shot calibration by trying to minimize the image residue into the desired signal. During this process, one or more tones are injected into the I/O channels 20, 22 for image rejection optimization. I/O mismatch is best compensated at the "one-shot" calibration frequencies. Selectivity filters 50, 52 may process digital corrected signals before they are combined in summer 53.

Direct conversion (i.e. homodyne) receivers directly downconvert the RF signals to a baseband signal without an IF conversion. The baseband signal may include 1/f noise and may be more sensitive to interference than the baseband signal of a heterodyne receiver.

Leakage of the image signal into the desired signal may occur in the IF mixers 46, 48 when the I/O channel signals are subtracted (in summer 53). The coefficients for gain and phase mismatch correction are applied to incoming signals on I/Q channels 20, 22. The coefficients correct the gain and phase mismatch between I/O channels 20, 22. Residual phase and gain error may be used to determine image rejection. Due to the receiver architecture, when there is no I/Q mismatch, the image rejection may be infinite.

Where there is mismatch along the I/O paths, I and Q channels are not in exact quadrature, and as a result, image leakage appears in the desired signal, and a signal leakage appears in the image signals. I/Q compensation systems used in receivers traditionally tried to minimize the image residue into the output signal (after summer 53). Some other I/Q compensation systems use a new technique based on the estimation of the correlation between the I and Q signals. Such I/O mismatch compensation systems apply a digital correction filter to received I/Q signals. By reducing the correlation between I/Q channels, the image leakage in the signal band is reduced; and the signal leakage in the image band is reduced.

I/Q mismatch compensation systems based on adaptive algorithms are limited by DC offsets, which affect the correlation between I and Q channels. Still further, I/Q mismatch compensation systems may be affected by strong tones, which may be out-of-band interferers that limit correct compensations for I/Q mismatches.

SUMMARY

A phase mismatch compensation system comprises a first summer that has a first input that communicates with a first phase of a received signal and an output. A second summer has a first input that communicates with a second phase of the received signal and an output. The second phase is offset from the first phase. A first filter selectively filters the output of the first summer. An adaptive control module determines a predicted shift between the first and second phases of the received signal based on an output of the first filter and an actual shift between the first and second phases of the received signal. A correction module communicates with an output of the adaptive control module and the first phase and second phase of the received signal. The correction module outputs a mismatch correction to second inputs of the first and second summers respectively.

In other features, the first phase comprises an in-phase (I) signal, and the second phase comprises a quadrature (Q) signal. The adaptive control module determines coefficients for gain and phase mismatch correction. The system further comprises a second filter that selectively filters the output of the second summer.

In other features, the adaptive control module determines the predicted shift between the first and second phases based on an output from the second filter. The first and second filters comprise at least one of a low-pass filter, a high-pass filter, and a bandpass filter. The bandpass filter comprises a high-pass filter and a low-pass filter. The first and second filters comprise at least one of a finite impulse response filter and an infinite impulse response filter. The first filter selectively filters direct current (DC) offsets from the output of the first summer. The first filter selectively filters 1/f noise from the output of the first summer.

In other features, the adaptive control module generates adaptive complex coefficients $(W_0(n), W_1(n), \ldots, W_k(n))$ for the I/Q mismatch filter/correction module:

$$W_0(n+1) = W_0(n) + \mu(U_j(n)U_j(n))$$

$$W_i(n+1) = W_i(n) + \mu(U_j(n)U_j(n-1))$$

...

$$W_k(n+1) = W_k(n) + \mu(U_j(n)U_j(n-k)).$$

$U_f$ is the complex representation of the respective outputs of first and second filters. $U_f(n)=I''(n)+jQ''(n)$, $\mu$ is the adaptation step size, and n is the time index. The output of the I/Q mismatch compensation system may be represented by:

$$U_S(n)=I'(n)+jQ'(n)=S(n)-W_0(n)\times S^*(n)-W_1(n)\times S^*(n-1)-W_2(n)\times S^*(n-2)-\ldots-W_k(n)\times S^*(n-k).$$

Where $U_s$ is the complex representation of the first and second summer outputs (I' represents the output of the first summer; Q' represents the output of the second summer). S is the complex representation of the input signal, where $S(n)=I(n)+jQ(n)$. $S^*(n)$ is the complex conjugate of S, where $S^*(n)=I(n)-jQ(n)$. k is a tap index that ranges from 1 to n, where n is an integer greater than 1.

In other features, a receiver comprises the phase mismatch compensation system. The receiver further comprises a mixer that down converts the received signal to an intermediate frequency (IF) signal. An analog-to-digital converter digitizes the IF signal. The phase mismatch compensation system receives the first phase and the second phase from the analog-to-digital converter. The received signal is a radio frequency (RF) signal.

In other features, a gain and phase mismatch compensation system comprises a first feedback loop that comprises a first summer that has a first input that communicates with a first phase of a received signal and an output. A second feedback loop comprises a second summer that has a first input that communicates with a second phase of the received signal and an output. The second phase is offset from the first phase. A first filter of the first feedback loop selectively filters the output of the first summer. A second filter of the second feedback loop selectively filters the output of the second summer.

In other features, an adaptive control module determines a predicted shift between the first and second phases of the received signal. The predicted shift is based on outputs of the first and second filters and an actual shift between the first and second phases of the received signal. A correction module communicates with an output of the adaptive control module and the first phase and second phase of the received signal. The correction module outputs a mismatch correction to second inputs of the first and second summers respectively.

In other features, the adaptive control module determines the predicted shift between the first and second phases based on an output from the second filter. The first and second filters comprise at least one of a low-pass filter, a high-pass filter, and a bandpass filter. The first and second filters comprise at least one of a finite impulse response filter and an infinite impulse response filter.

In other features, the first filter selectively filters direct current (DC) offsets from the output of the first summer. The first filter selectively filters 1/f noise from the output of the first summer. The adaptive control module determines coefficients for gain and phase mismatch correction.

In other features, a phase mismatch compensation method comprises generating an output of a first summer based on a first phase of a received signal. The method also comprises generating an output of a second summer based on a second phase of the received signal and selectively filtering the output of the first summer in a first filter. The second phase is offset from the first phase.

In other features, the method determines a predicted shift between the first and second phases of the received signal. The predicted shift is based on an output of the first filter and an actual shift between the first and second phases of the received signal. The method also comprises outputting a mismatch correction to second inputs of the first and second summers respectively. The mismatch correction is based on the predicted shift and the first and second phases of the received signal. The first phase comprises an in-phase (I) signal, and the second phase comprises a quadrature (Q) signal.

In other features, the phase mismatch compensation method further comprises determining coefficients for gain and phase mismatch correction. The method comprises selectively filtering the output of the second summer in a second filter. The method further comprises determining the predicted shift between the first and second phases based on an output from the second filter. The first and second filters comprise at least one of a low-pass filter, a high-pass filter, and a bandpass filter. The first and second filters comprise at least one of a finite impulse response filter and an infinite impulse response filter.

In other features, the phase mismatch compensation method further comprises selectively filtering direct current (DC) offsets from the output of the first summer in the first filter. The method further comprises selectively filtering 1/f noise from the output of the first summer.

In other features, a gain and phase mismatch compensation method comprises generating an output of a first summer of a first feedback loop based on a first phase of a received signal. The method also comprises generating an output in a second summer of a second feedback loop base on a second phase of the received signal. The second phase is offset from the first phase.

In other features, the method comprises selectively filtering the output of the first summer in a first filter of the first feedback loop. The method also comprises selectively filtering the output of the second summer in a second filter of the second feedback loop. The method also comprises determining a predicted shift between the first and second phases of the received signal based on an output of the first and second filters and an actual shift between the first and second phases of the received signal. The method comprises outputting a mismatch correction to second inputs of the first and second summers respectively based on the predicted shift and the first and second phases of the received signal.

In other features, the method comprises determining the predicted shift between the first and second phases based on an output from the second filter. The first and second filters comprise at least one of a low-pass filter, a high-pass filter, and a bandpass filter. The first and second filters comprise at least one of a finite impulse response filter and an infinite impulse response filter.

In other features, the method comprises selectively filtering direct current (DC) offsets from the output of the first summer in the first filter. The method further comprises selectively filtering 1/f noise from the output of the first summer in the first filter. The method further comprises determining coefficients for gain and phase mismatch correction.

In other features, a phase mismatch compensation system comprises first summing means for summing that has a first input that communicates with a first phase of a received signal and an output. Second summing means for summing has a first input that communicates with a second phase of the received signal and an output. The second phase is offset from the first phase. The system also comprises first filtering means for selectively filtering the output of the first summing means. The system also comprises adaptive control means for controlling. The adaptive control means determines a predicted shift between the first and second phases of the received signal. The predicted shift is based on an output of the first filtering means and an actual shift between the first and second phases of the received signal.

In other features, the system also comprises correction means for correcting that communicates with an output of the adaptive control means and the first phase and second phase of the received signal. The correction means outputs a mismatch correction to second inputs of the first and second summing means respectively. The first phase comprises an in-phase (I) signal, and the second phase comprises a quadrature (Q) signal. The adaptive control means determines coefficients for gain and phase mismatch correction.

In other features, the phase mismatch compensation system comprises second filtering means for selectively filtering the output of the second summing means. The adaptive control means determines the predicted shift between the first and second phases based on an output from the second filtering means. The first and second filtering means comprise at least one of a low-pass filter, a high-pass filter, and a bandpass filter. The bandpass filter comprises a high-pass filter and a low-pass filter.

In other features, the first and second filtering means comprise at least one of a finite impulse response filter and an infinite impulse response filter. The first filtering means selectively filters direct current (DC) offsets from the output of the first summing means. The first filtering means selectively filters 1/f noise from the output of the first summing means.

In other features, the adaptive control module generates adaptive complex coefficients ($W_0(n), W_1(n), \ldots, W_k(n)$) for the I/Q mismatch filter/correction means.

$$W_0(n+1)=W_0(n)+\mu(U_f(n)U_f(n))$$

$$W_1(n+1)=W_1(n)+\mu(U_f(n)U_f(n-1))$$

$$\ldots$$

$$W_k(n+1)=W_k(n)+\mu(U_f(n)U_f(n-k)).$$

$U_f$ is the complex representation of the respective outputs of first and second filtering means. $U_f(n)=I''(n)+jQ''(n)$, and $\mu$ is the adaptation step size. The output of the I/Q mismatch compensation system may be represented by:

$$U_S(n)=I'(n)+jQ'(n)=S(n)-W_0(n)\times S^*(n)-W_1(n)\times S^*(n-1)-W_2(n)\times S^*(n-2)-\ldots-W_k(n)\times S^*(n-k).$$

Where $U_s$ is the complex representation of the first and second outputs (I' represents the output of the first summing means; Q' represents the output of the second summing means). S is the complex representation of the input signal, where $S(n)=I(n)+jQ(n)$. $S^*(n)$ is the complex conjugate of S, where $S^*(n)=I(n)-jQ(n)$. k is a tap index that ranges from 1 to n, where n is an integer greater than 1.

In other features, receiving means for receiving comprises the phase mismatch compensation system. The system further comprises mixing means for mixing that down converts the received signal to an intermediate frequency (IF) signal. Converting means for converting signals digitizes the IF signal. The phase mismatch compensation system receives the first phase and the second phase from the converting means. The received signal is a radio frequency (RF) signal.

In other features, a gain and phase mismatch compensation system comprises first feedback means for feeding back. The system also comprises first summing means for summing that has a first input that communicates with a first phase of a received signal and an output. Second feedback means for feeding back comprises second summing means for summing. The second summing means has a first input that communicates with a second phase of the received signal and an output. The second phase is offset from the first phase.

In other features, first filtering means for filtering within the first feedback means selectively filters the output of the first summing means. Second filtering means for filtering within the second feedback means selectively filters the output of the second summing means. Adaptive control means for controlling determines a predicted shift between the first and second phases of the received signal. The predicted shift is based on outputs of the first and second filtering means and an actual shift between the first and second phases of the received signal. Correction means for correcting communicates with an output of the adaptive control means and the first phase and second phase of the received signal. The correction means outputs a mismatch correction to second inputs of the first and second summing means respectively.

In other features, the adaptive control means determines the predicted shift between the first and second phases based on an output from the second filtering means. The first and second filtering means comprise at least one of a low-pass filter, a high-pass filter, and a bandpass filter. The first and second filtering mean comprise at least one of a finite impulse response filter and an infinite impulse response filter. The first filtering means selectively filters direct current (DC) offsets from the output of the first summing means. The first filtering means selectively filters 1/f noise from the output of the first summing means. The adaptive control means determines coefficients for gain and phase mismatch correction.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of a receiver system according to the prior art;

FIG. 2A is a signal diagram of an image signal and a desired signal according to the prior art;

FIG. 2B is a signal diagram of a desired signal corrupted by an image signal according to the prior art;

FIG. 12A is a functional block diagram of a high definition television (HDTV);

FIG. 12B is a functional block diagram of a cellular phone;

FIG. 12C is a functional block diagram of a set top box; and

DETAILED DESCRIPTION

Figure 3A:
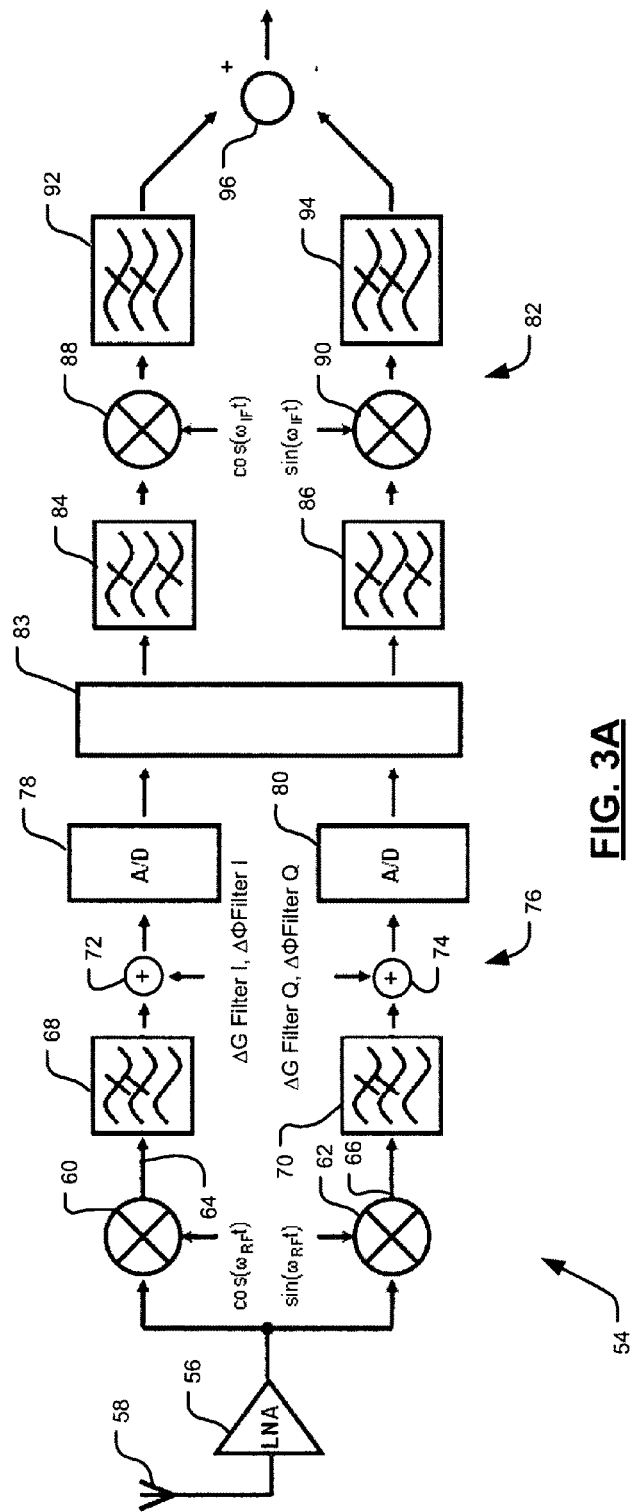
FIG. 3A is a functional block diagram of a receiver system according to the present disclosure.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Figure 3B:
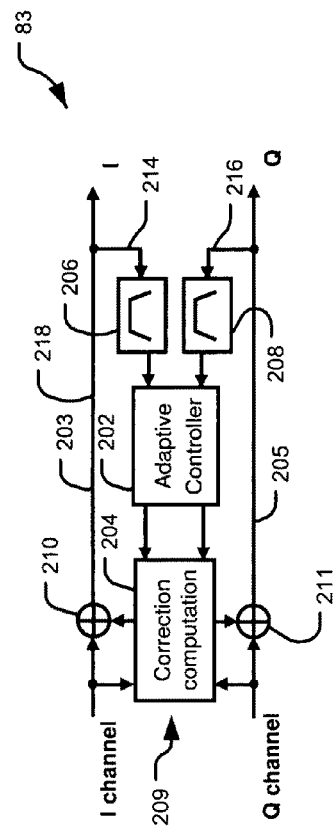
FIG. 3B is a functional block diagram of an I/Q mismatch compensation system according to the present disclosure.

Referring now to FIGS. 3A and 3B, a receiver 54 receives radio frequency (RF) signals in a low noise amplifier (LNA) 56 via an antenna 58. An in-phase (I) channel mixer 60 and a quadrature (Q) channel mixer 62 downconvert the incoming RF signals to an intermediate frequency (IF). The I/Q channels 64, 66 may be routed to respective filters 68, 70. The I/Q channels 64, 66 may include an image signal and a desired signal.

Summers 72, 74 may compensate gain and/or phase mismatches in the analog domain 76. Analog-to-digital converters 78, 80 convert the compensated signals to the digital domain 82. An I/Q mismatch compensation system 83 corrects I/Q channel mismatches and may be implemented anywhere between the ND converters 78, 80 and IF mixers 88, 90. Filters 84, 86, IF mixers 88, 90, and filters 92, 94 may process digital signals before they are combined in summer 96.

An adaptive control module 202 of the I/Q mismatch compensation system 83 applies an adaptive filtering process to I/Q channel paths 203, 205 through a correction computation module 204. The I/O channels may include an image signal and a desired signal. The adaptive control module 202 receives subsequent iterations or taps through filters 206, 208 in a feedback loop 209.

The adaptive control module 202 generates adaptive complex coefficients ($W_0(n)$, $W_1(n)$, . . . , $W_k(n)$) for the I/Q mismatch correction filter (correction computation module 204):

$$W_0(n+1)=W_0(n)+\mu(U_f(n)U_f(n))$$

$$W_1(n+1)=W_1(n)+\mu(U_f(n)U_f(n-1))$$

. . .

$$W_k(n+1)=W_k(n)+\mu(U_f(n)U_f(n-k)).$$

$U_f$ is the complex representation of the respective outputs of first and second filters. $U_f(n)=I''(n)+jQ''(n)$, $\mu$ is the adaptation step size, and n is the time index. The output of the I/Q mismatch compensation system may be represented by:

$$U_S(n)=I'(n)+jQ'(n)=S(n)-W_0(n)\times S^*(n)-W_1(n)\times S^*(n-1)-W_2(n)\times S^*(n-2)-\ldots-W_k(n)\times S^*(n-k).$$

Where $U_s$ is the complex representation of the first and second summer outputs (I' represents the output of a first summer 210; Q' represents the output of a second summer 211). S is the complex representation of the input signal, where $S(n)=I(n)+jQ(n)$. $S^*(n)$ is the complex conjugate of S, where $S^*(n)=I(n)-jQ(n)$. k is a tap index that ranges from 1 to n, where n is an integer greater than 1.

The filter coefficients change according to the amount of baseline shift not corrected by the predicted shift $S^*(n)$. Generally, the coefficients iteratively change the size of predicted shifts when predicted shifts differ from the actual shift. Adaptive coefficients may be represented as $W_k(n+1)=W_k(n)+\rho(U_S(n)\times U_S(n-k))$, where $\mu$ is the adaptation step size that controls the speed at which filter coefficients adapt to I/Q channel imperfections.

Referring now to FIGS. 3A, 3B, 4A, 4B, 5A, 5B, and 6, the adaptive control module 202 may be used for wideband compensation. The adaptive decorrelation process may generate coefficients to zero the difference in auto-correlation and cross-correlation between I/Q outputs through the correction computation module 204 and summers 210, 211 for the first tap. For higher order taps, coefficients may be generated from minimization of higher order correlation properties between I/Q channels. Cross-correlation is a measure of similarity of I/O signals and auto-correlation is the cross-correlation of a signal with itself. Phase mismatch may be represented as a non-zero cross-correlation between I/Q channels. Gain mismatch may be represented as a difference in auto-correlation between I/Q channels.

Figure 4A:
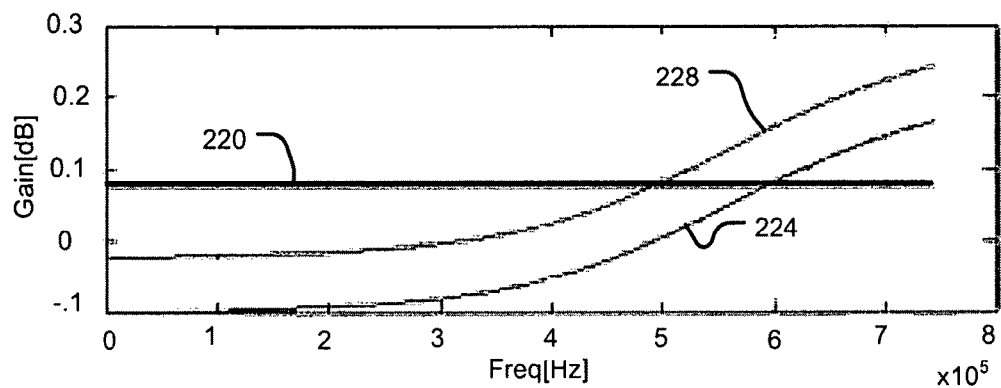
FIG. 4A is a graph of a gain frequency response for a one tap filter I/Q mismatch compensation according to the present disclosure.
Figure 4B:
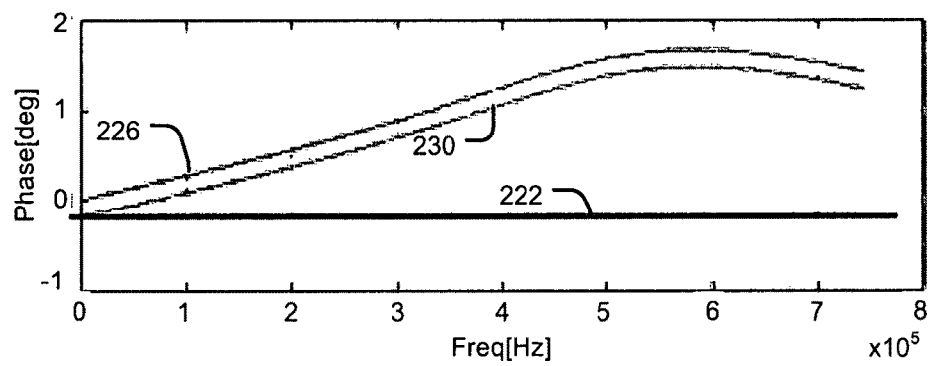
FIG. 4B is a graph of a phase frequency response for a one tap filter I/Q mismatch compensation according to the present disclosure.
Figure 5A:
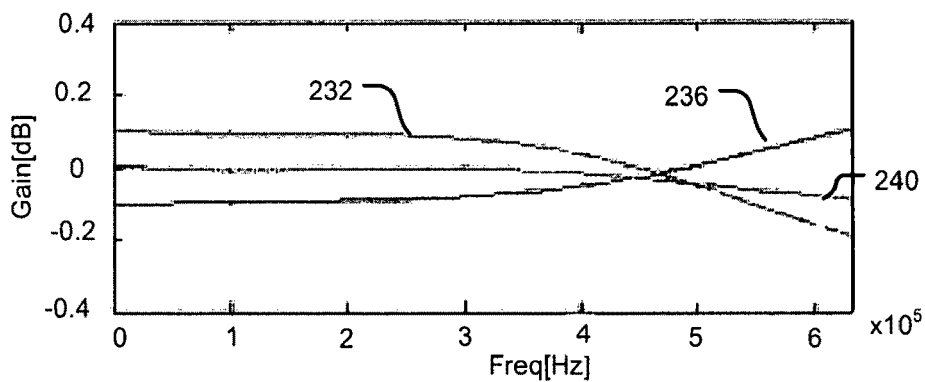
FIG. 5A is a graph of a gain frequency response for a three tap filter I/Q mismatch compensation according to the present disclosure.
Figure 5B:
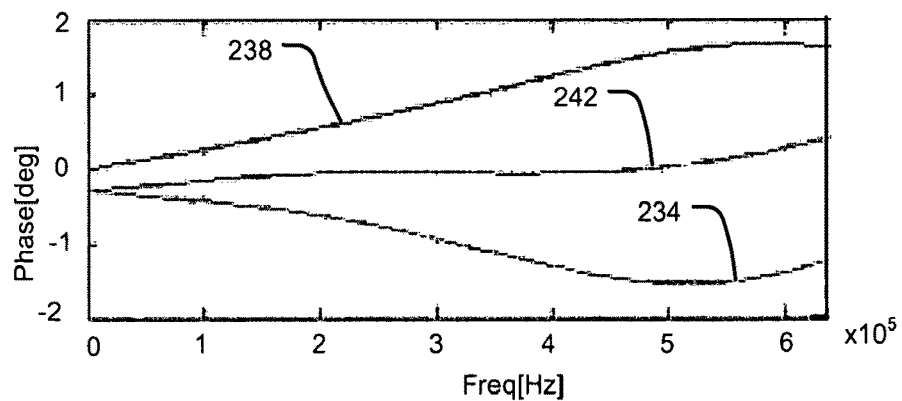
FIG. 5B is a graph of a phase frequency response for a three tap filter I/Q mismatch compensation according to the present disclosure.
Figure 6:
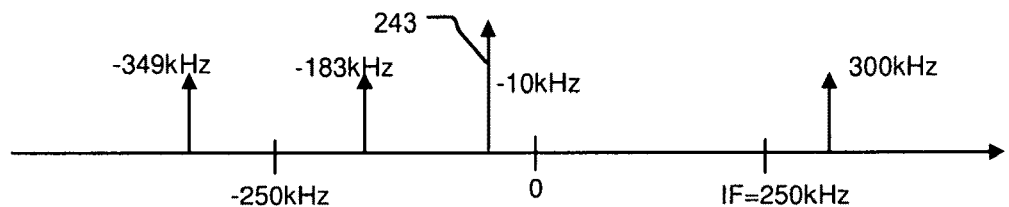
FIG. 6 is a diagram of a strong interferer according to the present disclosure.

Gain and phase frequency responses are illustrated in FIGS. 4A and 4B for a single tap mismatch compensation. The single tap mismatch compensation includes the correction signals 220, 222, and the gain and phase frequency responses before correction 224, 226 and after correction 228, 230. Gain and phase frequency responses are illustrated in FIGS. 5A and 5B for a three tap mismatch compensation including the correction signal 232, 234, and the gain and phase frequency responses before correction 236, 238 and after correction 240, 242. The first tap includes, for example, only seven additions and seven multiplications and additional taps include eight additions and eight multiplication. The tap summers and multipliers may share computational resources through multiplexing operations. FIG. 6 illustrates a setup for simulation results depicted in FIGS. 4A, 4B, 5A, and 5B.

Figure 7A:
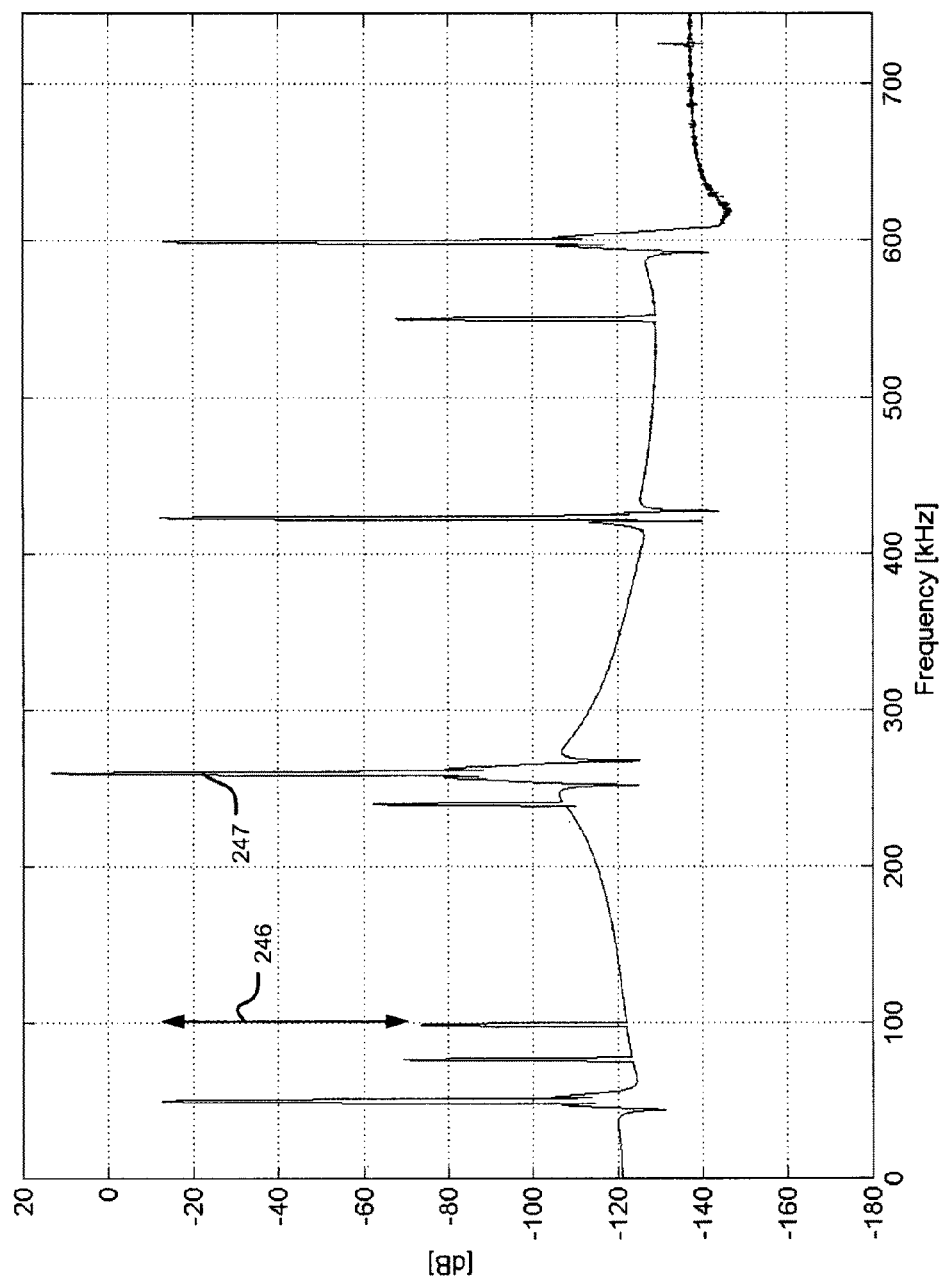
FIG. 7A is a graph of a frequency response of the I/Q mismatch compensation system according to the present disclosure.
Figure 7B:
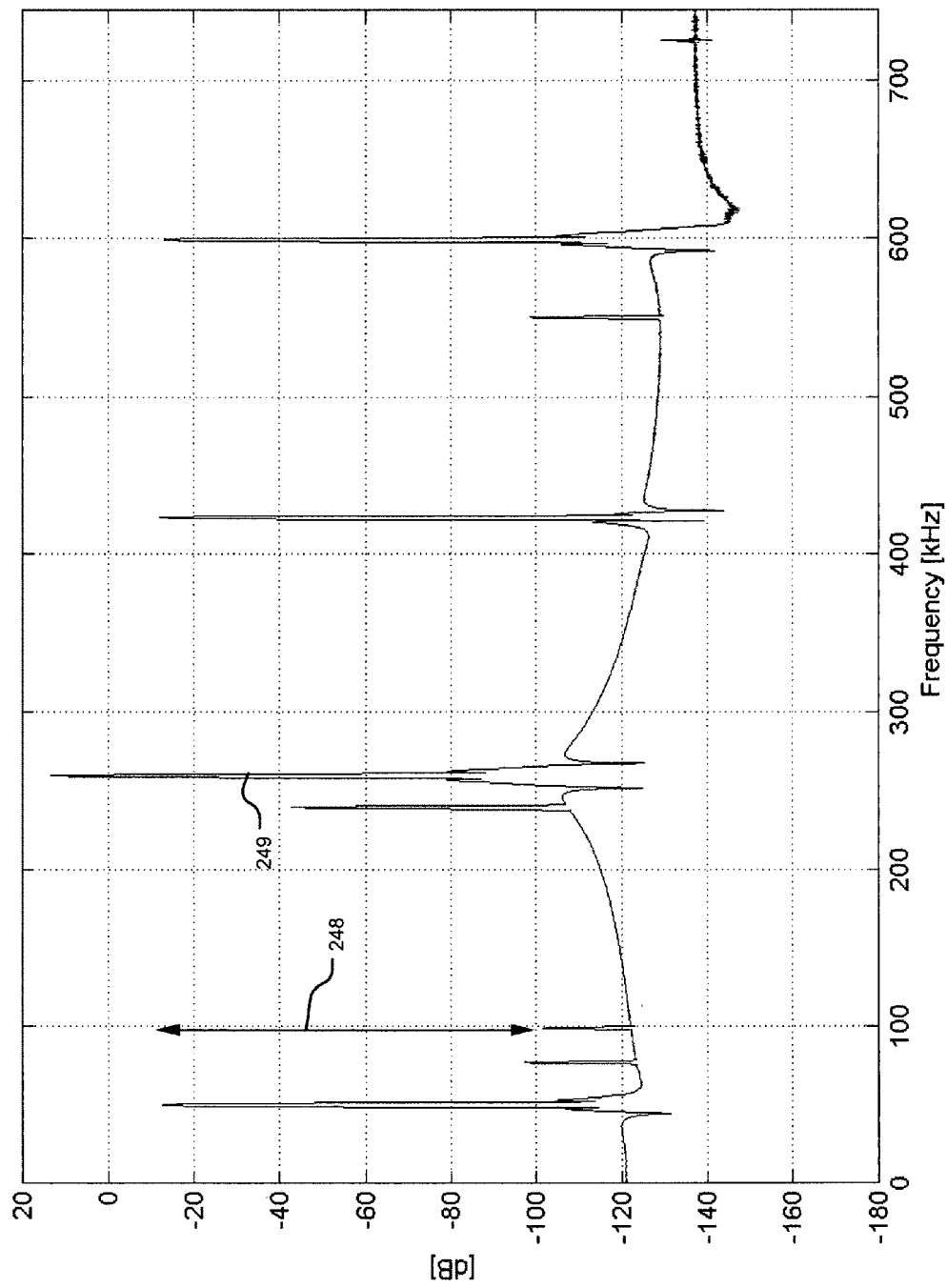
FIG. 7B is a graph of a frequency response of the I/Q mismatch compensation system including a bandpass filter according to the present disclosure.

Referring now to FIGS. 7A, and 7B, bandpass filters 206, 208 are used to select a band of frequencies where I/Q signals mismatch may be compensated. The filters 206, 208 are in the coefficient calculation paths 214, 216, and generally do not effect the desired signal path 218, which therefore allows less expensive filters to be used. The bandpass filters may include a finite impulse response (FIR) filter, an infinite impulse filter and/or a combination of a low-pass filter with a high-pass filter. The bandpass filters 206, 208 may attenuate the effect of strong out-of-band interferers 243 and may cancel DC offset. FIG. 7A illustrates a frequency response of the system 83 without the bandpass filters 206, 208; and FIG. 7B illustrates the frequency response of the system 83 including fourth order bandpass filters 206, 208.

The image rejection ratio (IRR) is the ratio of the image frequency signal input to the antenna 58 to the desired input frequency signal for identical outputs. When the image rejection ratio is measured, the input signal levels of the desired and image frequencies are equal. IRR is primarily limited by gain and phase mismatches between I and Q channels. In FIG. 7A, the IRR 246 is, for example 62 dB; and the rejection of the strong interferer 247 is 75 dB. In FIG. 7B, the IRR 248 is 84 dB; and the rejection of the interferer 249 is 55 dB.

Figure 8:
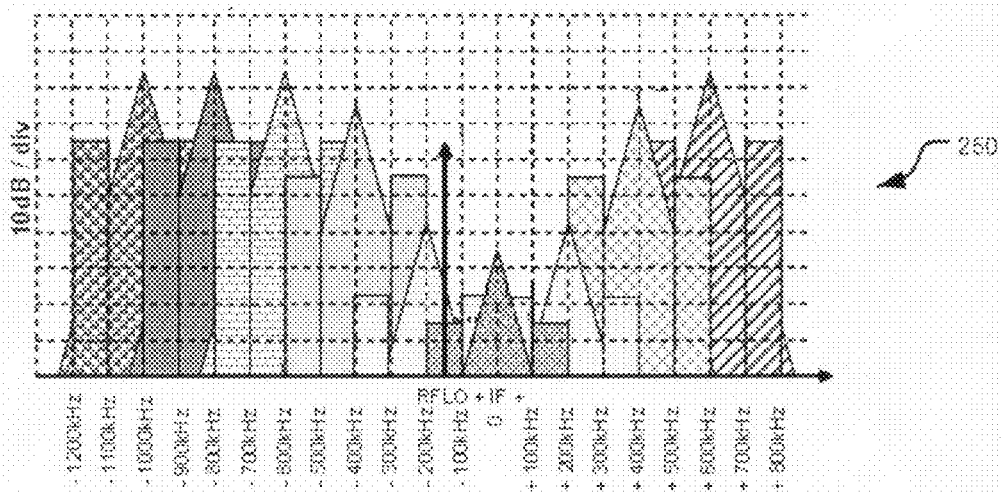
FIG. 8 is a graph of a radio frequency (RF) spectrum according to the present disclosure.
Figure 9:
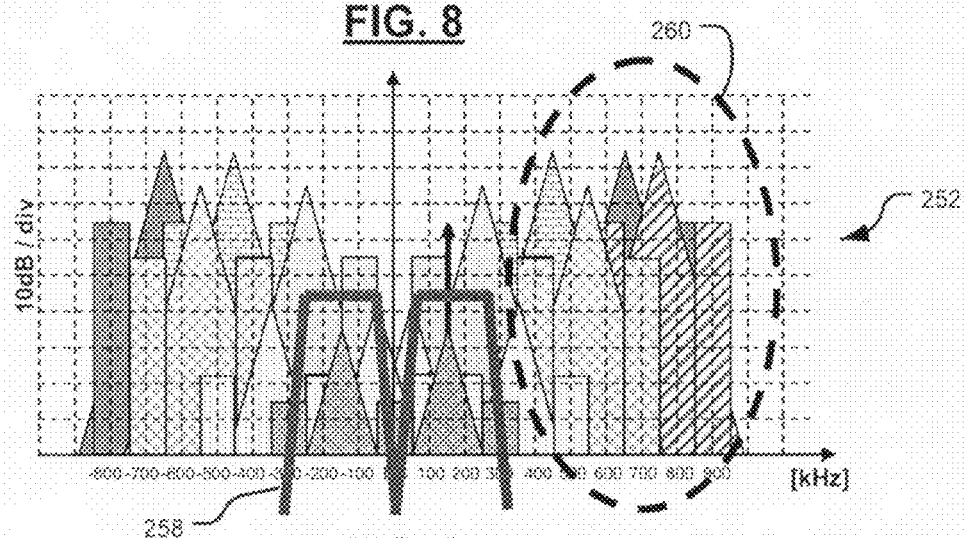
FIG. 9 is a graph of an RF spectrum at the intermediate frequency (IF) with a portion of the RF spectrum selected by a bandpass filter according to the present disclosure.
Figure 10:
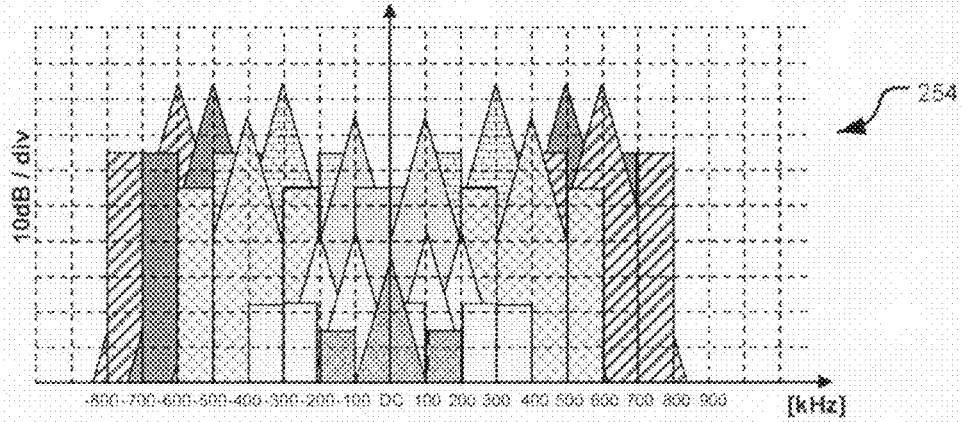
FIG. 10 is a graph of a baseband frequency spectrum according to the present disclosure.

Referring now to FIGS. 8, 9, and 10, an FM radio receiver frequency spectrum 250, an IF spectrum 252, and a baseband frequency spectrum 254 are illustrated. In the IF spectrum 252, bandpass filters 206, 208 select the band of interest 258 where the image rejection is supposed to be perfect. The bandpass filters 206, 208 therefore limit effect of strong interferers 260 on the adaptive control module 202.

Figure 11:
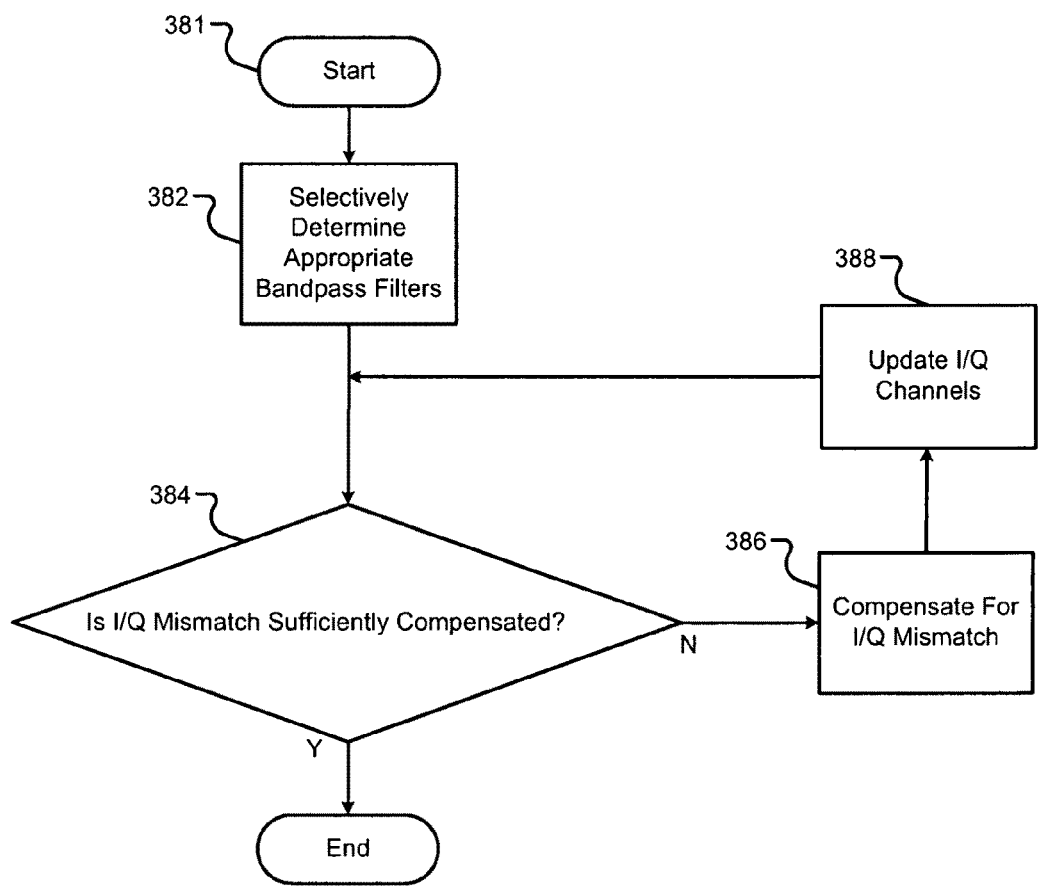
FIG. 11 is a flowchart of an exemplary I/Q mismatch compensation operational method according to the present disclosure.

Referring now to FIG. 11, control starts in step 381. In step 382, a passband filter is selectively determined that will remove interferers from the I/Q channel signals. The bandpass filter may be fixed or alternatively reprogrammable. Generally, the filter may be determined by optimizing I/Q mismatch in the frequency band of interest in the presence of various interferer signals and DC offset levels. In step 384, if I/Q mismatch is sufficiently compensated, control ends. If step 384 is false, I/O compensation in the adaptive control module determines an I/Q mismatch or offset coefficient in step 386. In step 388, the I/Q channels are updated and control loops back to step 384.

Figure 12D:
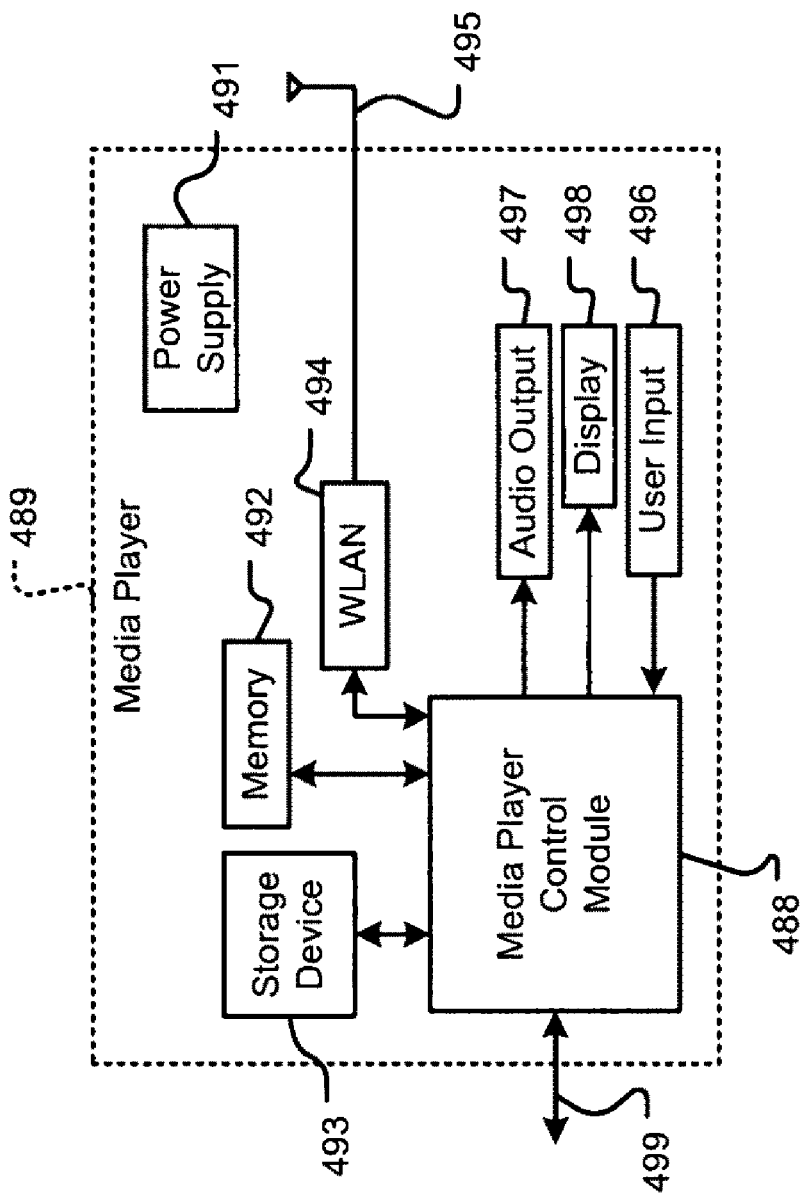
FIG. 12D is a functional block diagram of a media player.

Referring now to FIGS. 12A-12D, various exemplary implementations incorporating the teachings of the present disclosure are shown. Referring now to FIG. 12A, the mismatch compensation system can be implemented in a control module 435 of a high definition television (HDTV) 437. The HDTV 437 includes a display 439, a power supply 440, memory 441, a storage device 442, a WLAN interface 443 and associated antenna 444, and an external interface 445.

The HDTV 437 can receive input signals from the WLAN interface 443 and/or the external interface 445, which sends and receives information via cable, broadband Internet, and/or satellite. The HDTV control module 435 may process the input signals, including encoding, decoding, filtering, and/or formatting, and generate output signals. The output signals may be communicated to one or more of the display 439, memory 441, the storage device 442, the WLAN interface 443, and the external interface 445.

Memory 441 may include random access memory (RAM) and/or nonvolatile memory such as flash memory, phase change memory, or multi-state memory, in which each memory cell has more than two states. The storage device 442 may include an optical storage drive, such as a DVD drive, and/or a hard disk drive (HDD). The HDTV control module 435 communicates externally via the WLAN interface 443 and/or the external interface 445. The power supply 440 provides power to the components of the HDTV 437.

Referring now to FIG. 12B, the mismatch compensation system can be implemented in a phone control module 457 of a cellular phone 458. The cellular phone 458 includes a phone control module 457, a power supply 462, memory 464, a storage device 466, and a cellular network interface 467. The cellular phone 458 may include a WLAN interface 468 and associated antenna 469, a microphone 470, an audio output 472 such as a speaker and/or output jack, a display 474, and a user input device 476 such as a keypad and/or pointing device.

The phone control module 457 may receive input signals from the cellular network interface 467, the WLAN interface 468, the microphone 470, and/or the user input device 476. The phone control module 457 may process signals, including encoding, decoding, filtering, and/or formatting, and generate output signals. The output signals may be communicated to one or more of memory 464, the storage device 466, the cellular network interface 467, the WLAN interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 458.

Referring now to FIG. 12C, the mismatch compensation system can be implemented in a set top control module 477 of a set top box 478. The set top box 478 includes a set top control module 477, a display 481, a power supply 482, memory 483, a storage device 484, and a WLAN interface 485 and associated antenna 486.

The set top control module 477 may receive input signals from the WLAN interface 485 and an external interface 487, which can send and receive information via cable, broadband Internet, and/or satellite. The set top control module 477 may process signals, including encoding, decoding, filtering, and/or formatting, and generate output signals. The output signals may include audio and/or video signals in standard and/or high definition formats. The output signals may be communicated to the WLAN interface 485 and/or to the display 481. The display 481 may include a television, a projector, and/or a monitor.

The power supply 482 provides power to the components of the set top box 478. Memory 483 may include random access memory (RAM) and/or nonvolatile memory such as flash memory, phase change memory, or multi-state memory, in which each memory cell has more than two states. The storage device 484 may include an optical storage drive, such as a DVD drive, and/or a hard disk drive (HDD).

Referring now to FIG. 12D, the mismatch compensation system can be implemented in a control module 488 of a media player 489. The media player 489 may include a media player control module 488, a power supply 491, memory 492, a storage device 493, a WLAN interface 494 and associated antenna 495, and an external interface 499.

The media player control module 488 may receive input signals from the WLAN interface 494 and/or the external interface 499. The external interface 499 may include USB, infrared, and/or Ethernet. The input signals may include compressed audio and/or video, and may be compliant with the MP3 format. Additionally, the media player control module 488 may receive input from a user input 496 such as a keypad, touchpad, or individual buttons. The media player control module 488 may process input signals, including encoding, decoding, filtering, and/or formatting, and generate output signals.

The media player control module 488 may output audio signals to an audio output 497 and video signals to a display 498. The audio output 497 may include a speaker and/or an output jack. The display 498 may present a graphical user interface, which may include menus, icons, etc. The power supply 491 provides power to the components of the media player 489. Memory 492 may include random access memory (RAM) and/or nonvolatile memory such as flash memory, phase change memory, or multi-state memory, in which each memory cell has more than two states. The storage device 493 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A phase mismatch compensation system comprising:
   a first feedback loop comprising a first summer, wherein said first summer has a first input that communicates with a first phase of a received signal and has an output;
   a second feed back loop comprising a second summer, wherein said second summer has a first input that communicates with a second phase of said received signal and has an output, wherein said second phase is offset from said first phase;
   a first filter that selectively filters said output of said first summer;
   an adaptive control module that determines a predicted shift between said first and second phases of said received signal based on an output of said first filter and an actual shift between said first and second phases of said received signal; and
   a correction module that communicates with an output of said adaptive control module and said first phase and second phase of said received signal, that outputs a mismatch correction to second inputs of said first and second summers respectively.

2. The phase mismatch compensation system of claim 1 wherein said first phase comprises an in-phase (I) signal.

3. The phase mismatch compensation system of claim 1 wherein said second phase comprises a quadrature (Q) signal.

4. The phase mismatch compensation system of claim 1 wherein said adaptive control module determines coefficients for gain and phase mismatch correction.

5. The phase mismatch compensation system of claim 1 further comprising a second filter that selectively filters said output of said second summer.

6. The phase mismatch compensation system of claim 5 wherein said adaptive control module determines said predicted shift between said first and second phases based on an output from said second filter.

7. The phase mismatch compensation system of claim 5 wherein said first and second filters comprise at least one of a low-pass filter, a high-pass filter, and a bandpass filter.

8. The phase mismatch compensation system of claim 7 wherein said bandpass filter comprises a high-pass filter and a low-pass filter.

9. The phase compensation system of claim 7 wherein said first and second filters comprise at least one of a finite impulse response filter and an infinite impulse response filter.

10. The phase mismatch compensation system of claim 1 wherein said first filter selectively filters direct current (DC) offsets from said output of said first summer.

11. The phase mismatch compensation system of claim 1 wherein said first filter selectively filters 1/f noise from said output of said first summer.

12. The phase mismatch compensation system of claim 1 wherein $U_S$ is a complex representation of said first and second summer outputs such that $U_S(n)=I'(n)+jQ'(n)=S(n)-W_0(n) \times S^*(n) - W_1(n) \times S^*(n-1) - W_2(n) \times S^*(n-2) - \ldots -W_k(n) \times S^*(n-k+1)$, where I' is said first summer output, Q' is said second summer output, S is a complex representation of said input signal affected by I/Q mismatch such that $S(n)=I(n)+jQ(n)$, S* is a complex conjugate of S such that $S^*(n)=I(n)-jQ(n)$, and $W_0(n)$, $W_1(n)$, $W_2(n)$ are adaptive complex coefficients for said correction module where k is a tap index that ranges from 1 to n, where n is an integer greater than 1.

13. A receiver comprising the phase mismatch compensation system of claim 1 and further comprising:
   a mixer that down converts said received signal to an intermediate frequency (IF) signal; and
   an analog-to-digital converter that digitizes said IF signal, wherein the phase mismatch compensation system receives said first phase and said second phase from said analog-to-digital converter.

14. The receiver as in claim 13 wherein said received signal is a radio frequency (RF) signal.

15. A gain and phase mismatch compensation system comprising:
   a first feedback loop comprising a first summer, wherein said first summer has a first input that communicates with a first phase of a received signal and has an output;
   a second feedback loop comprising a second summer, wherein said second summer has a first input that communicates with a second phase of said received signal and has an output, wherein said second phase is offset from said first phase;
   a first filter of said first feedback loop that selectively filters said output of said first summer;
   a second filter of said second feedback loop that selectively filters said output of said second summer;
   an adaptive control module that determines a predicted shift between said first and second phases of said received signal based on outputs of said first and second filters and an actual shift between said first and second phases of said received signal; and
   a correction module that communicates with an output of said adaptive control module and said first phase and second phase of said received signal, that outputs a mismatch correction to second inputs of said first and second summers respectively.

16. The phase mismatch compensation system of claim 15 wherein said adaptive control module determines said predicted shift between said first and second phases based on an output from said second filter.

17. The phase mismatch compensation system of claim 15 wherein said first and second filters comprise at least one of a low-pass filter, a high-pass filter, and a bandpass filter.

18. The phase compensation system of claim 15 wherein said first and second filters comprise at least one of a finite impulse response filter and an infinite impulse response filter.

19. The phase mismatch compensation system of claim 15 wherein said first filter selectively filters direct current (DC) offsets from said output of said first summer.

20. The phase mismatch compensation system of claim 15 wherein said first filter selectively filters 1/f noise from said output of said first summer.

21. The phase mismatch compensation system of claim 15 wherein said adaptive control module determines coefficients for gain and phase mismatch correction.

22. A phase mismatch compensation method comprising:
   generating an output of a first summer of a first feedback loop based on a first phase of a received signal;
   generating an output of a second summer of a second feedback loop based on a second phase of said received signal, wherein said second phase is offset from said first phase;

selectively filtering said output of said first summer in a first filter;

determining a predicted shift between said first and second phases of said received signal based on an output of said first filter and an actual shift between said first and second phases of said received signal; and outputting a mismatch correction to second inputs of said first and second summers respectively based on said predicted shift and said first and second phases of said received signal.

23. The phase mismatch compensation method of claim 22 wherein said first phase comprises an in-phase (I) signal.

24. The phase mismatch compensation method of claim 22 wherein said second phase comprises a quadrature (Q) signal.

25. The phase mismatch compensation method of claim 22 further comprising determining coefficients for gain and phase mismatch correction.

26. The phase mismatch compensation method of claim 22 further comprising selectively filtering said output of said second summer in a second filter.

27. The phase mismatch compensation method of claim 26 further comprising determining said predicted shift between said first and second phases based on an output from said second filter.

28. The phase mismatch compensation method of claim 26 wherein said first and second filters comprise at least one of a low-pass filter, a high-pass filter, and a bandpass filter.

29. The phase compensation method of claim 26 wherein said first and second filters comprise at least one of a finite impulse response filter and an infinite impulse response filter.

30. The phase mismatch compensation method of claim 22 further comprising selectively filtering direct current (DC) offsets from said output of said first summer in said first filter.

31. The phase mismatch compensation method of claim 22 further comprising selectively filtering 1/f noise from said output of said first summer.

32. A gain and phase mismatch compensation method comprising:

generating an output of a first summer of a first feedback loop based on a first phase of a received signal;

generating an output in a second summer of a second feedback loop base on a second phase of said received signal, wherein said second phase is offset from said first phase;

selectively filtering said output of said first summer in a first filter of said first feedback loop;

selectively filtering said output of said second summer in a second filter of said second feedback loop;

determining a predicted shift between said first and second phases of said received signal based on an output of said first and second filters and an actual shift between said first and second phases of said received signal; and outputting a mismatch correction to second inputs of said first and second summers respectively based on said predicted shift and said first and second phases of said received signal.

33. The phase mismatch compensation method of claim 32 further comprising determining said predicted shift between said first and second phases based on an output from said second filter.

34. The phase mismatch compensation method of claim 32 wherein said first and second filters comprise at least one of a low-pass filter, a high-pass filter, and a bandpass filter.

35. The phase compensation method of claim 32 wherein said first and second filters comprise at least one of a finite impulse response filter and an infinite impulse response filter.

36. The phase mismatch compensation method of claim 32 further comprising selectively filtering direct current (DC) offsets from said output of said first summer in said first filter.

37. The phase mismatch compensation method of claim 32 further comprising selectively filtering 1/f noise from said output of said first summer in said first filter.

38. The phase mismatch compensation method of claim 32 further comprising determining coefficients for gain and phase mismatch correction.

* * * * *